United States Patent [19]
Ester et al.

[11] 3,862,249
[45] Jan. 21, 1975

[54] METHOD OF MANUFACTURING ALCOHOLS

[75] Inventors: Wilhelm Ester; Wilhelm Heitmann, both of Herne, Germany

[73] Assignee: Hibernia-Chemie GmbH, Gelsenkirchen-Buer, Germany

[22] Filed: Apr. 14, 1972

[21] Appl. No.: 244,231

Related U.S. Application Data

[63] Continuation of Ser. No. 810,902, Feb. 20, 1969, abandoned, which is a continuation-in-part of Ser. No. 564,688, July 12, 1966, abandoned.

[30] Foreign Application Priority Data
July 24, 1965  Germany................................ 37432

[52] U.S. Cl. .............................. 260/641, 252/435
[51] Int. Cl. ............................................. C07c 29/04
[58] Field of Search.................... 260/641; 252/435

[56] References Cited
UNITED STATES PATENTS

| | | |
|---|---|---|
| 2,504,618 | 4/1950 | Archibald et al. .................. 260/641 |
| 2,579,601 | 12/1951 | Nelson et al. ...................... 260/641 |
| 2,663,744 | 12/1953 | Lukasiewicz et al. .............. 260/641 |
| 2,974,054 | 3/1961 | Besmesderfer et al. ............ 252/450 |
| 3,076,036 | 1/1963 | Hansen .............................. 260/641 |

FOREIGN PATENTS OR APPLICATIONS

| | | |
|---|---|---|
| 981,237 | 1/1965 | Great Britain ..................... 252/437 |
| 1,249,845 | 9/1967 | Germany ........................... 260/641 |

*Primary Examiner*—Joseph E. Evans
*Attorney, Agent, or Firm*—Burgess, Dinklage & Sprung

[57] ABSTRACT

Improvements in the production of alcohols by hydration of their corresponding olefins, particularly olefins having three to six carbon atoms, in the presence of an acid catalyst, wherein the improvement resides in utilizing a catalyst which is a mineral acid, preferably phosphoric acid, impregnated into a substrate in a minimum proportion necessary to catalyze the reaction, which proportion is such that substantially no acid is removed from the catalyst under hydration reaction conditions.

7 Claims, 1 Drawing Figure

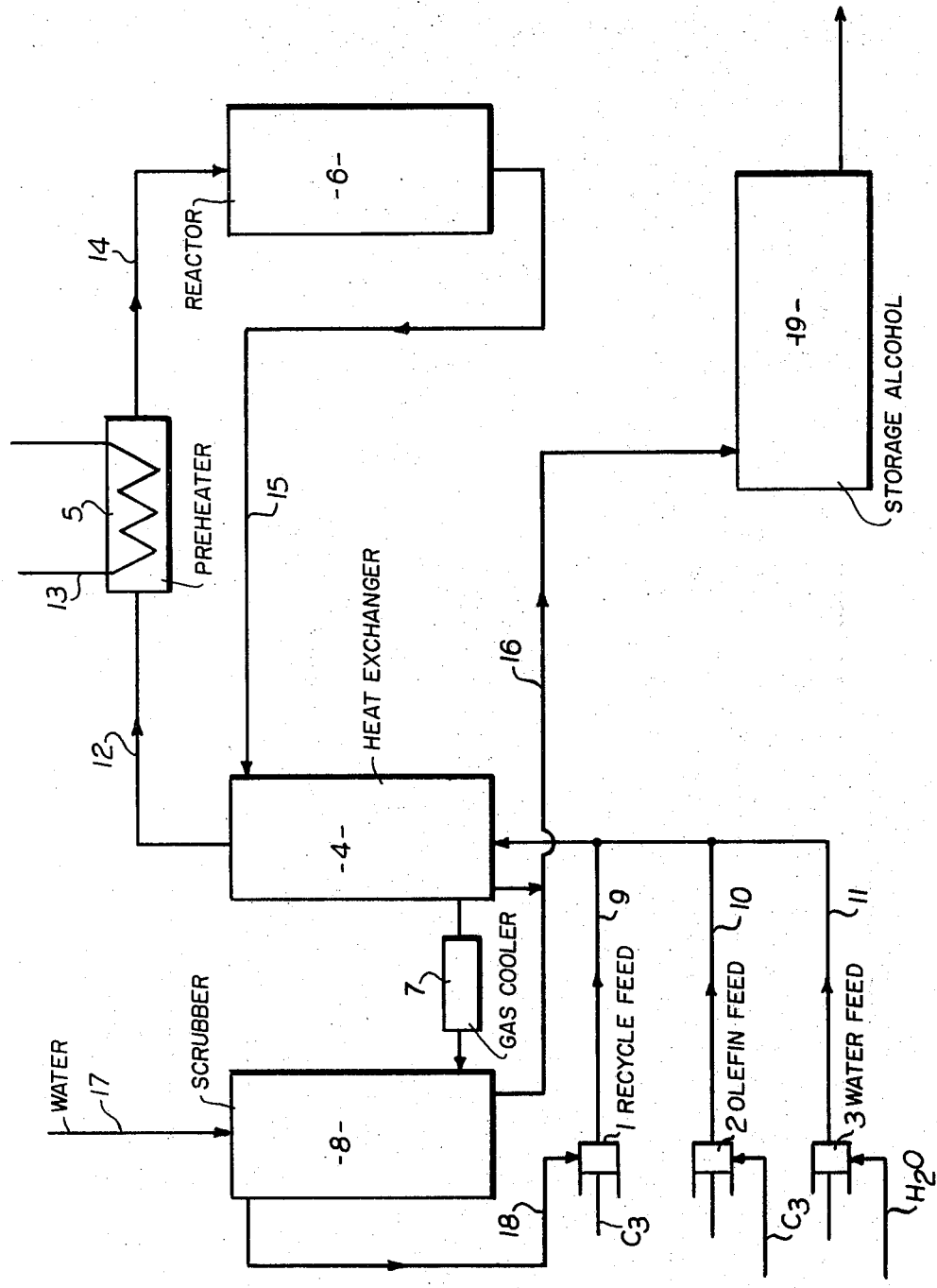

METHOD OF MANUFACTURING ALCOHOLS

This application is a continuation of application Ser. No. 810,902 filed Feb. 20, 1969, now abandoned, said application Ser. No. 810,902 being in turn a continuation-in-part of application, Ser. No. 564,688 filed July 12, 1966, now abandoned.

This invention relates to the production of alcohols. It more particularly refers to the production of alcohols by the hydration of olefins.

It is known to produce alcohols by the hydration of their corresponding olefins. Thus, it has been the commercial practice to produce ethanol, isopropanol and sec-butanol by the hydration of ethylene, propylene and butylene respectively. The time honored, and perhaps industrially most significant, process for hydrating olefins to alcohols proceeds through the use of sulfuric acid as the hydrating agent. It is generally the practice to react olefins with sulfuric acid to form, for example, ethyl sulfate or isopropyl sulfate and then to hydrolyze the sulfate with water to the alcohol while producing as a byproduct relatively dilute sulfuric acid. The byproduct dilute sulfuric acid is concentrated and reused in the process.

Despite the fact that the so-called "sulfuric acid hydration" process of producing alcohols from olefins has been and is being used by industry to produce the major amount of alcohols from olefins, it has been generally recognized that this process leaves much to be desired from an economic point of view. In particular, the capital cost, the corrosion caused by the lost sulfuric acid and the sulfuric acid losses in the process have been the individual factors to which have been attributed the economic deficiencies of this process.

Industry has therefore attempted to devise improved processes based upon sulfuric acid hydration of olefins to produce the corresponding alcohols. In addition, industry has sought various alternate routes to hydrate olefins which avoided the burdensome capital expenditures of the sulfuric acid process and other operating costs. For example, there is in the patent literature at least a proposal for the production of alcohols from olefins which utilizes a strong acid ion exchange "catalyst" whereby it is stated to be possible to hydrate olefins to their corresponding alcohols in a one step operation with little or no byproduct formation and no separate acid concentration step. The use of the ion exchange resin is limited by their poor temperature resistance above 140° C.

It has been suggested to use dilute sulfuric acid catalyst and to discard the sulfuric acid byproduct of the hydration. This process would seek to improve the economies of the situation by avoiding the acid reconcentration unit operation.

Another process which is presently being practiced by industry involves the gas phase direct hydration of ethylene to ethanol over a solid catalyst which is a porous substrate impregnated with phosphoric acid. In this gas phase hydration process, it is typical to provide a mole ratio of about 0.4 to 0.8 mole of water per mole of ethylene. While this process has shown some advantage over the concentrated sulfuric acid method, namely in the fact that the acid consumption in the process has been reduced from about 2 to 5 tons of acid per ton of produced alcohol to about 0.4 to 0.8 kilograms of acid per tons of alcohol, this process still leaves something to be desired from an economics point of view since there is still a significant acid loss to be considered. Further, there are certain production problems encountered in this process which would be desirable to either eliminate if possible or at least minimize. These include the production of byproducts and the removal of these as well as acid contaminant in the product, and corrosion caused by acid losses.

It is therefore an object of this invention to provide an improved process for the production of alcohols from olefins.

It is another object of this invention to provide a process for the production of alcohols from olefins which is more economical than prior processes.

It is a further object of this invention to provide an improved process for the hydration of olefins to their corresponding alcohols.

It is still further an object of this invention to provide a process for the production of alcohols in which there is less byproduct formation than in prior processes.

It is still another object of this invention to provide a process for the production of alcohols, wherein the resulting product is less contaminated than in prior processes.

Other and additional objects of this invention will become apparent from a consideration of this entire specification including the claims and the drawing appended hereto.

In accord with and fulfilling these objects, this invention includes, as one of its aspects, the direct hydration of olefins to their corresponding alcohols in the presence of a solid catalyst comprising a relatively porous substrate impregnated with a minimum of phosphoric acid.

It would appear that the acid does not act as a true catalyst which induces the reaction but does not actually participate in it, but rather that the acid is a continuously regenerated reactant which participates in the hydration reaction and is reconstituted as part of it. Therefore, it would be expected that the efficiency of the process would increase with an increase in the amount of acid present during the hydration process. Surprisingly it has been found that the process is markedly improved, not by increasing the amount of acid present, but rather by minimizing the quantity of acid available to the reaction. It has been found that by operating in accord with this invention, the amount of byproduct produced in the hydration process is significantly reduced and that the product resulting from this process is substantially purer and in need of less severe purification than the product as made by prior art processes.

Understanding of this invention will be facilitated by reference to the accompanying drawing which is a block flow diagram of the process of this invention.

In the practice of this invention it has been found to be practical to operate in the gas phase or the liquid phase as the case may be depending to a great extent upon the particular olefin being hydrated. For example, it is preferred to hydrate propylene to isopropanol in the gas or vapor phase, but propylene and butylene can be hydrated in a mixed gas-liquid phase too. The amount of acid in the catalyst and the reaction conditions are so chosen that substantially no acid is removed from the catalyst during the process.

The proportion of acid in the catalyst should not be greater than 10%. Thus, on a weight ratio basis, the acid to total catalyst particle weight ratio should be up to about 0.1.

The catalyst substrate is suitable any of the many well known materials often used as substrates, for example, diatomaceous earths, montmorillonite, alundum, kieselgur and the like. This substrate is suitably impregnated with acid, preferably phosphoric acid.

While not intending to be bound in any way by the theory of operation of this process, it has been postulated that in using as little acid as possible, the acid in the substrate is held by sorption forces so great that the acid impregnated substrate actually acts as an inorganic ion exchange resin. In this regard, it has been found to be particularly advantageous to use as the substrate a montmorillonite which has been acid-treated to produce a product containing less than about 10 weight percent aluminum oxide. One method of producing such a substrate is shown in German Pat. Publication No. 1,156,772.

The process of this invention is suitably carried out at elevated temperature and pressure. It will be appreciated that the reaction phase will be determined by a consideration of the temperature and pressure of the reaction and that the desirability of any particular combination of temperature and pressure will be to a great extent determined by the particular reactant involved. In general, it may be stated, that the operating temperature, when using $C_3$ to $C_4$ olefins, is suitably about 140° to 250° C. Pressures between about 10 and 100 atmospheres have been found to be suitable for use in either gas or liquid phase operation. Pressures of about 10 to 50 atmospheres have been found to be preferred for gas phase operation.

The process is suitably carried out by feeding a mixture of the olefin to be hydrated and water into contact with the catalyst maintained in a reaction zone at the appropriate temperature and pressure. The water and olefin may be mixed prior to introduction into the reaction zone or they may be introduced separately and mixed in the reactor. The reactants may flow cocurrent or countercurrent through the reaction zone as desired. It is preferred in the practice of this invention to preheat the reactants before feeding them to the reaction zone. This may be accomplished by any of the usual heat exchange means. It is preferred to provide heat exchange between the reaction product and the reactants in order to preserve as much of the energy input of the process as possible.

The process of this invention may be carried out using a mole excess of either reactant. While it is preferred to operate with a slight mole excess of olefin, such is not essential and the reactant water may be used in excess under some conditions. Thus, the mole ratio of olefin to water may vary from about 1 to 0.4 to about 1 to 10. The process of this invention is particularly well suited to use in connection with the hydration of lower olefins, for example, those containing up to about 6 carbon atoms.

The catalyst of this invention preferably comprises up to about one part by weight of acid per 10 parts by weight of substrate. It is of course understood that if the amount of acid in the catalyst composition is too small to efficiently catalyze the hydration reaction, such amount is not considered to be within the scope of this invention.

Referring now to the drawing, fresh olefin is suitably compressed 2 and fed through a line 10 into admixture with water feed 3 (fed through line 11) and recycle olefin 1 (fed through a line 9). The olefin-water admixture is passed through a heat exchanger 4 and thence via lines 12 and 14 through preheater 5 and into a reactor 6 charged with catalyst. The heater 5 may be a heat exchanger having a heat exchange fluid 13 passing therethrough or it may be direct fired as the case may be. The effluent of the reactor 6 passes via line 15 through the heat exchanger 4 where the heat of the reaction product is used to preheat the reactants.

The reaction product in passing through the heat exchanger 4 is partially condensed with the liquid fraction being removed via line 16 to an alcohol storage tank 19. The uncondensed gases from the heat exchanger 4 pass through a gas cooler 7 into a scrubber 8, wherein water 17 washes additional product alcohol from the gases which also flows through line 16 into the alcohol storage tank. The residual gases emerging from the scrubber 8 proceed via line 18 to the recycle compressor 1 and thence back around the system.

The following examples are illustrative of the practice of this invention without in any way being limiting of the scope thereof.

EXAMPLE I

Production of the catalyst:

2 tons of montmorillonite in the form of balls of 3 to 4 mm diameter (Type K 306, delivered by Suedchemie) are boiled for 24 hours with 3.5 $m^3$ of 20% hydrochloric acid under reflux. After draining off the hydrochloric acid, washing is effected with water until the discharging water gives a negative reaction for chloride ions with silver nitrate. The catalyst is thereupon dried by blowing hot air (about 120° C) into it and then is impregnated to saturation with 30% phosphoric acid. The catalyst absorbed 110 g of phosphoric acid per kg of catalyst. The catalyst is brought to the required phosphoric acid content by treating it under the subsequent operating conditions with nitrogen steam or nitrogen water (liquid) until practically no further phosphoric acid was removed.

Under the reaction conditions of example II, that means 17,000 $m^3$ (STP)/hour of nitrogen and 10 $m^3$/hour of water are fed together under a pressure of 25 atmospheres gauge and a temperature of 200° C through the catalyst. After a time of 2.5 hours no more phosphoric acid is removed out of the catalyst. The phosphoric acid content in the catalyst is 5.5 wt.%.

EXAMPLE II

Hydration:

17,000 $m^3$ (STP)/hour of propylene (85%) and 3.7 $m^3$ of fresh 99.6% propylene (1,000 $m^3$ (STP)) are fed together with 10.0 $m^3$ of water under a pressure of 25 atmospheres gauge through a heat exchanger. The gas-liquid mixture is heated to about 160° C by the gases leaving the catalyst reactor. Thereupon the still partially liquid mixture emerging from the heat exchanger is indirectly heated to 200° C by hot steam and then conducted into a ctalytic reactor. As a result of the enthalpy of the reaction (12.8 kcal/mol), the temperature of the gases leaving the catalytic reactor increases to 215° C. These gases give off their heat in the heat exchanger in countercurrent to the products charged. The isopropanol/water mixture, which is condensed in the heat exchanger, flows into a dilute alcohol storage tank; the phosphoric acid content of this dilute alcohol is 5 ppm; the gas is cooled in a gas cooler to 70° C and then washed in a scrubber in countercurrent with 1.4 m³ of water, whereupon the residual gases are recycled. The dilute alcohol flowing off in the bottom of the scrubber contains about 21% isopropanol and less than 1 ppm phosphoric acid. The dilute alcohol which is collected in the dilute alcohol storage tank, after its pressure is reduced to 1 atmosphere absolute is distilled and has the following composition:

| | |
|---|---|
| 19.2% | isopropanol |
| 0.08% | n-propanol |
| 0.02% | acetone |
| 0.06% | diisopropylether |
| 1 ppm | phosphoric acid. |

In addition to the gas obtained upon the evaporation of the dilute alcohol, there is discharged from the system such an amount of recycled gas that the total quantity is 30 m³ (STP)/hour, so as to maintain the propylene concentration at 85%.

EXAMPLE III 37,000 m³ (STP)/hour of propylene (85%) and 7.0 m³ of fresh propylene (1,900 m³(STP)) having a concentration of 99.6% are heated together with 31 m³ of water, in the manner described in Example II, at a pressure of 40 atmospheres gauge in a heat exchanger by the reaction products in countercurrent flow to about 145° C and then heated in a preheater with steam to 180° C. The reaction mixture which is then heated by the formation of isopropanol in a catalytic reactor, gives off a part of its heat in the heat exchanger to the charge materials. The water-isopropanol mixture which is withdrawn here in liquid form contains 12 ppm phosphoric acid. After cooling to 95° C, the gases are scrubbed in countercurrent in a scrubbing column with 2.5 m³ of water of 95° C in countercurrent and then recycled. The dilute alcohol obtained in the bottom of the scrubber contains 2 ppm phosphoric acid while the product withdrawn jointly via conduit (16) into the dilute alcohol storage tank (19) from the heat exchanger (4) and the scrubber (8) has the following composition:

| | |
|---|---|
| 14.2% | isopropanol |
| 0.04% | n-propanol |
| 0.01% | acetone |
| 0.02% | diisopropylether |
| 8 ppm | phosphoric acid |

The catalyst used in this example III is prepared as described in example I. The surplus of phosphoric acid is removed up to 4,8 %.

EXAMPLE IV

Comparison of propylene conversion, selectively and phosphoric acid content in the dilute isopropanol in relation to the phosphoric acid content in the catalyst under the conditions of example 2:

These conditions are:

| | |
|---|---|
| temperature by entrance into the reactor | 200°C |
| pressure by entrance into the reactor | 25 atm. |
| molar ratio propylene: water | 1 : 0,8 |
| propylene concentration in the recycled gas | 85 Vol. % |
| space velocity  $\dfrac{\text{Vol } C_3H_6 + \text{Vol } H_2O \text{ (STP)}}{\text{Vol catalyst} \quad \text{minute}}$ | 22 |

The following tests are carried out. Results of these tests are shown in Tabel A.

TABLE A

| Test No. | g H$_3$PO$_4$ Kg catalyst | Conversion per pass | mg H$_3$PO$_4$ in kg 6 dilute alcohol | Selectivity % |
|---|---|---|---|---|
| 1 | 413 | 3,9 | 225 | 95,5 |
| 2 | 308 | 3,4 | 185 | 95,8 |
| 3 | 194 | 3,6 | 123 | 96,0 |
| 4 | 98 | 5,5 | 2 | 96,2 |
| 5 | 55 | 4,8 | 1 | 96,3 |

What is claimed is:

1. In a process for the hydration of $C_3$ to $C_6$ mono-olefins to their corresponding alcohols at temperature and pressure operating conditions of about 140° to 250° C and about 10 to 100 atmospheres, the improvement which comprises carrying out said hydration in the presence of a catalyst comprising phosphoric acid impregnated montmorillonite containing phosphoric acid in an amount sufficient to efficiently catalyze the hydration reaction up to about one part by weight of phosphoric acid per ten parts by weight of montmorillonite, said catalyst being prepared by impregnating acid treated montmorillonite with phosphoric acid to saturation and thereafter bringing said catalyst to said phosphoric acid content by treatment under said operating conditions of 140° to 250° C and about 10 to 100 atmospheres with nitrogen and steam or water until practically no further phosphoric acid is removed.

2. Process of claim 1 wherein said mono-olefin is selected from the group consisting of propylene and butylene.

3. Process of claim 1 carried out in the vapor phase.

4. Process of claim 1 wherein the mono-olefin is propylene.

5. Process of claim 1 wherein the mole ratio of olefin to water is from about 1 to 0.4 to about 1 to 10.

6. Process of claim 1 wherein said montmorillonite has an aluminum oxide content of less than about 10 weight percent.

7. In a process for the hydration of $C_3$ to $C_6$ mono-olefins to their corresponding alcohols at temperature and pressure operating conditions of about 140° to 250° C and about 10 to 100 atmospheres, the improvement which comprises carrying out said hydration in the presence of a catalyst comprising phosphoric acid impregnated montmorillonite containing phosphoric acid in an amount sufficient to efficiently catalyze the hydration reaction up to about one part by weight of phosphoric acid per ten parts by weight of montmorillonite, said montmorillonite containing less than about 10 weight percent aluminum oxide.

* * * * *